US011354590B2

(12) United States Patent
Gupta et al.

(10) Patent No.: US 11,354,590 B2
(45) Date of Patent: Jun. 7, 2022

(54) RULE DETERMINATION FOR BLACK-BOX MACHINE-LEARNING MODELS

(71) Applicant: Adobe Inc., San Jose, CA (US)

(72) Inventors: Piyush Gupta, Noida (IN); Sukriti Verma, Delhi (IN); Pratiksha Agarwal, Delhi (IN); Nikaash Puri, New Delhi (IN); Balaji Krishnamurthy, Noida (IN)

(73) Assignee: Adobe Inc., San Jose, CA (US)

( * ) Notice: Subject to any disclaimer, the term of this patent is extended or adjusted under 35 U.S.C. 154(b) by 931 days.

(21) Appl. No.: 15/812,991

(22) Filed: Nov. 14, 2017

(65) Prior Publication Data

US 2019/0147369 A1    May 16, 2019

(51) Int. Cl.
*G06N 20/00*        (2019.01)
*G06N 5/04*         (2006.01)
(Continued)

(52) U.S. Cl.
CPC .............. *G06N 20/00* (2019.01); *G06N 3/084* (2013.01); *G06N 3/126* (2013.01); *G06N 5/045* (2013.01);
(Continued)

(58) Field of Classification Search
CPC combination set(s) only.
See application file for complete search history.

(56) References Cited

U.S. PATENT DOCUMENTS 5,398,300 A * 3/1995 Levey .................. G06N 3/0427
706/16
8,078,617 B1   12/2011 Neveitt et al.
(Continued)

FOREIGN PATENT DOCUMENTS

WO    WO-2018084867 A1 *  5/2018 ............. G06N 5/045

OTHER PUBLICATIONS

Alufaisan et al., "From Myths to Norms: Demystifying Data Mining Models with Instance-Based Transparency", Oct. 15-17, 2017, IEEE 3rd International Conference on Collaboration and Internet Computing (CIC), 2017, pp. 257-266, doi: 10.1109/CIC.2017.00042. IEEE, (Year: 2017).*
Ribeiro et al., "Model-Agnostic Interpretability of Machine Learning", Jun. 16, 2016, arXiv:1606.05386v1 (Year: 2016).*
Fidelis,"Discovering Comprehensible Classification Rules with a Genetic Algorithm", In Evolutionary Computation, 2000. Proceedings of the 2000 Congress on, vol. 1, Jul. 2000, 6 pages.
Cook,"Residuals and Influence in Regression", (New York: Chapman and Hall, 1982)—Retrieved at: https://conservancy.umn.edu/handle/11299/37076—on Sep. 14, 2017, 1982, 237 pages.
(Continued)

*Primary Examiner* — Alexey Shmatov
*Assistant Examiner* — Beatriz Ramirez Bravo
(74) *Attorney, Agent, or Firm* — FIG. 1 Patents

(57) ABSTRACT

Rule determination for black-box machine-learning models (BBMLMs) is described. These rules are determined by an interpretation system to describe operation of a BBMLM to associate inputs to the BBMLM with observed outputs of the BBMLM and without knowledge of the logic used in operation by the BBMLM to make these associations. To determine these rules, the interpretation system initially generates a proxy black-box model to imitate the behavior of the BBMLM based solely on data indicative of the inputs and observed outputs—since the logic actually used is not available to the system. The interpretation system generates rules describing the operation of the BBMLM by combining conditions—identified based on output of the proxy black-box model—using a genetic algorithm. These rules are output as if-then statements configured with an if-portion formed as a list of the conditions and a then-portion having an indication of the associated observed output.

20 Claims, 7 Drawing Sheets

(51) Int. Cl.
| | |
|---|---|
| *G06N 3/12* | (2006.01) |
| *G06N 3/08* | (2006.01) |
| *G06N 5/00* | (2006.01) |
| *G06N 20/20* | (2019.01) |
| *G06N 5/02* | (2006.01) |

(52) U.S. Cl.
CPC ............. *G06N 5/003* (2013.01); *G06N 5/025* (2013.01); *G06N 20/20* (2019.01)

(56) References Cited

U.S. PATENT DOCUMENTS

| | | | | |
|---|---|---|---|---|
| 10,311,368 | B2* | 6/2019 | Lokare | G06N 20/10 |
| 10,581,887 | B1* | 3/2020 | Dinerstein | G06N 3/08 |
| 10,609,434 | B2 | 3/2020 | Singhai et al. | |
| 10,824,951 | B2* | 11/2020 | Yan | G06N 7/005 |
| 10,824,959 | B1* | 11/2020 | Chatterjee | G06N 3/08 |
| 2006/0218108 | A1* | 9/2006 | Panfilov | G06N 5/025 |
| | | | | 706/13 |
| 2011/0231256 | A1 | 9/2011 | Wang et al. | |
| 2011/0288907 | A1 | 11/2011 | Harvey et al. | |
| 2012/0191531 | A1 | 7/2012 | You et al. | |
| 2012/0221416 | A1 | 8/2012 | Matuk | |
| 2013/0326375 | A1 | 12/2013 | Barak et al. | |
| 2014/0222737 | A1* | 8/2014 | Chen | G06N 20/20 |
| | | | | 706/12 |
| 2014/0337271 | A1* | 11/2014 | Cox | G06F 16/00 |
| | | | | 706/47 |
| 2015/0278877 | A1 | 10/2015 | Yi et al. | |
| 2016/0134934 | A1 | 5/2016 | Jared et al. | |
| 2017/0034592 | A1 | 2/2017 | Ray et al. | |
| 2017/0083386 | A1 | 3/2017 | Wing et al. | |
| 2017/0201779 | A1 | 7/2017 | Publicover et al. | |
| 2017/0293849 | A1* | 10/2017 | Hodjat | G06N 5/025 |
| 2018/0018155 | A1 | 1/2018 | Sanan et al. | |
| 2018/0018590 | A1* | 1/2018 | Szeto | G16H 50/50 |
| 2018/0025287 | A1* | 1/2018 | Mathew | G06N 5/04 |
| | | | | 706/12 |
| 2018/0083996 | A1* | 3/2018 | Hodjat | H04L 63/1425 |
| 2018/0158552 | A1* | 6/2018 | Liu | G06N 3/0454 |
| 2018/0268291 | A1* | 9/2018 | Turner | G06N 3/0427 |
| 2018/0322395 | A1* | 11/2018 | Shahrzad | G06N 3/126 |
| 2020/0051118 | A1 | 2/2020 | Singhai et al. | |
| 2020/0053403 | A1 | 2/2020 | Singhai et al. | |
| 2020/0092593 | A1 | 3/2020 | Singhai et al. | |
| 2020/0126664 | A1* | 4/2020 | Sato | G16H 50/30 |
| 2020/0167691 | A1* | 5/2020 | Golovin | G06N 7/005 |
| 2020/0322662 | A1 | 10/2020 | Korte et al. | |
| 2021/0319473 | A1 | 10/2021 | Singhai et al. | |

OTHER PUBLICATIONS

Fisher,"The Use of Multiple Measurements in Taxonomic Problems", Annals of Human Genetics, vol. 7, Issue 2, Sep. 1936, 10 pages.
Ghosh,"Mining Frequent Itemsets Using Genetic Algorithm", International Journal of Artificial Intelligence & Applications (IJAIA), vol. 1, Oct. 2010, 11 pages.
Hall,"Ideas on interpreting machine learning", Retrieved at: https://www.oreilly.com/ideas/ideas-on-interpreting-machine-learning, Mar. 15, 2017, 70 pages.
Hastie,"Generalized Additive Models", Comment. Statist. Sci., vol. 1, No. 3 (1986), Aug. 1986, 14 pages.
Lakkaraju,"Interpretable Decision Sets: A Joint Framework for Description and Prediction", In Proceedings of the 22nd ACM SIGKDD International Conference on Knowledge Discovery and Data Mining, Aug. 2016, 10 pages.
Letham,"Interpretable classifiers using rules and Bayesian analysis: Building a better stroke prediction model", Nov. 5, 2015, 23 pages.
Lundberg,"An unexpected unity among methods for interpreting model predictions", Dec. 8, 2016, 6 pages.
Ribeiro,""Why Should I Trust You?" Explaining the Predictions of Any Classifier", In Proceedings of the 22nd ACM SIGKDD International Conference on Knowledge Discovery and Data Mining, Aug. 7, 2016, 10 pages.
Sharma,"Discovery of Classification Rules using Distributed Genetic Algorithm", 2015, 9 pages.
"Combined Search and Examination Report", GB Application No. 1814706.6, dated Mar. 12, 2019, 6 pages.
"Pre-Interview First Office Action", U.S. Appl. No. 16/057,743, dated Aug. 3, 2020, 3 pages.
"Restriction Requirement", U.S. Appl. No. 16/057,743, dated May 22, 2020, 6 pages.
"First Action Interview Office Action", U.S. Appl. No. 16/057,729, dated Oct. 29, 2019, 3 pages.
"Notice of Allowance", U.S. Appl. No. 16/057,729, dated Nov. 20, 2019, 5 pages.
"Pre-Interview First Office Action", U.S. Appl. No. 16/057,729, dated Sep. 11, 2019, 3 pages.
"Corrected Notice of Allowability", U.S. Appl. No. 16/057,729, dated Mar. 6, 2020, 2 pages.
"Final Office Action", U.S. Appl. No. 16/057,743, dated Dec. 3, 2020, 34 pages.
"First Action Interview Office Action", U.S. Appl. No. 16/057,743, dated Oct. 7, 2020, 3 pages.
"Foreign Office Action", GB Application No. 1814706.6, dated May 28, 2021, 5 pages.
"Foreign Office Action", GB Application No. 1814706.6, dated Mar. 5, 2021, 6 pages.
"Notice of Allowance", U.S. Appl. No. 16/694,612, dated May 18, 2021, 8 pages.
"Notice of Allowance", U.S. Appl. No. 16/057,743, dated Apr. 15, 2021, 11 pages.
"Pre-Interview First Office Action", U.S. Appl. No. 16/694,612, dated Feb. 22, 2021, 3 pages.
Shakeel, U. et al., "Leveraging Cloud-Based Predictive Analytics to Strengthen Audience Engagement", SMPTE Motion Imaging Journal, vol. 125, No. 8 [retrieved Apr. 8, 2021], Retrieved from the Internet <https://doi.org/10.5594/JMI.2016.2602121>., Oct. 2016, 9 pages.
"Final Office Action", U.S. Appl. No. 16/687,182, dated Oct. 26, 2021, 36 pages.
"Foreign Office Action", GB Application No. 1814706.6, dated Sep. 28, 2021, 3 pages.
"Corrected Notice of Allowability", U.S. Appl. No. 16/694,612, dated Aug. 2, 2021, 2 pages.
"First Action Interview Office Action", U.S. Appl. No. 16/687,182, dated Jul. 20, 2021, 31 pages.
"Pre-Interview First Office Action", U.S. Appl. No. 16/687,182, dated Jun. 18, 2021, 32 pages.
"Supplemental Notice of Allowability", U.S. Appl. No. 16/057,743, dated Aug. 5, 2021, 3 pages.

* cited by examiner

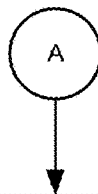

400

(A)

412
Combine the conditions generated for an observed output using a genetic algorithm to generate rules for the observed output

414
Remove redundant rules

416
Select a subset of remaining rules for each of the observed outputs based on at least one selection technique

418
Sort the selected rules based on a measure of fitness indicative of precision and coverage of a rule in relation to the observed outputs

420
Output the selected rules, the output rules being sorted and output as if-then statements

*Fig. 4B*

RULE DETERMINATION FOR BLACK-BOX MACHINE-LEARNING MODELS

BACKGROUND

Machine learning and artificial intelligence (AI) use in computing systems is becoming widespread. Indeed, the implementation of "intelligent" algorithms—algorithms that involve some degree of machine learning or AI—is present across many verticals of industry. These algorithms are present, for instance, in medicine, finance, imaging, electronic commerce, audio processing, and so on. Broadly speaking, there are two types of machine learning algorithms. A first type of these algorithms are based on relatively straightforward formulations and thus are generally interpretable. Examples of this first type include linear regression, logistic regression, decision trees, and so forth. An advantage of these algorithms is that their operation can be visualized and thus interpreted by humans. By way of example, weights learned for a linear regression model enable an analyst to determine a relative importance of different data attributes used by the model in arriving at a decision. Decisions made by models configured according to this first type of algorithm can thus be easily justified, e.g., the analyst can explain the decision by indicating how the determined weights bias certain attribute values to cause these models to arrive at the decision.

In contrast to this first type of algorithm is a second type that is based on formulations capable of representing non-linear functions. Examples of this second type of algorithm include neural networks, random forests, gradient boosted trees, and so forth. An advantage of these algorithms is that they are capable of modeling more complex patterns in data than the first type of algorithm and thus typically achieve higher accuracy in relation to most data sets than the first type. A tradeoff to achieve this higher level of accuracy, however, is model interpretability. Neural networks, for instance, generally include hidden layers with different activations and dropout, and random forests can have thousands of trees where a final decision is a function that combines individual predictions made by each of these trees. Such models may be considered "black boxes" insofar as the logic these models use during operation to produce outputs is largely not known. A lack of interpretability regarding how black-box models produce outputs can cause users to mistrust these models and also makes future planning in relation to outputs of such models difficult. This is because, due to the unknown logic of these models, analysts are not able to reliably predict the outputs of such models. Due to this lack of interpretability, some types of machine-learned models simply are not used for applications in which they may otherwise be useful.

SUMMARY

To overcome these problems, rule determination for black-box machine-learning models is leveraged in a digital medium environment. These rules are determined by an interpretation system to describe operation of a black-box machine-learning model to associate inputs to the model with observed outputs of the model and without knowledge of the logic used in operation by the model to make these associations. To determine these rules, the interpretation system initially obtains data indicative of the inputs and observed outputs of the black-box machine-learning model. The interpretation system generates a proxy black-box model to imitate the behavior of the black-box machine-learning model based on the obtained data.

Further, the interpretation system leverages probabilities provided by the proxy black-box model to generate conditions for the observed outputs of the black-box machine-learning model. With respect to these probabilities, the proxy black-box model outputs probabilities for a given input instance that the black-box machine-learning model associates each of the observed outputs with the input instance. The generated conditions are each a combination of a data attribute of the input instances and a value or range of values, e.g., from an input instance associated with an observed output according to the probabilities. The interpretation system then generates rules describing the operation of the black-box machine-learning model by combining these conditions using a genetic algorithm. The rules are then output as if-then statements configured with an if-portion formed as a list of the conditions and a then-portion having an indication of the associated observed output.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIGS. 4A and 4B depict a procedure in an example implementation in which rules are determined that describe operation of a black-box machine-learning model.

DETAILED DESCRIPTION

Overview

Figure 1:
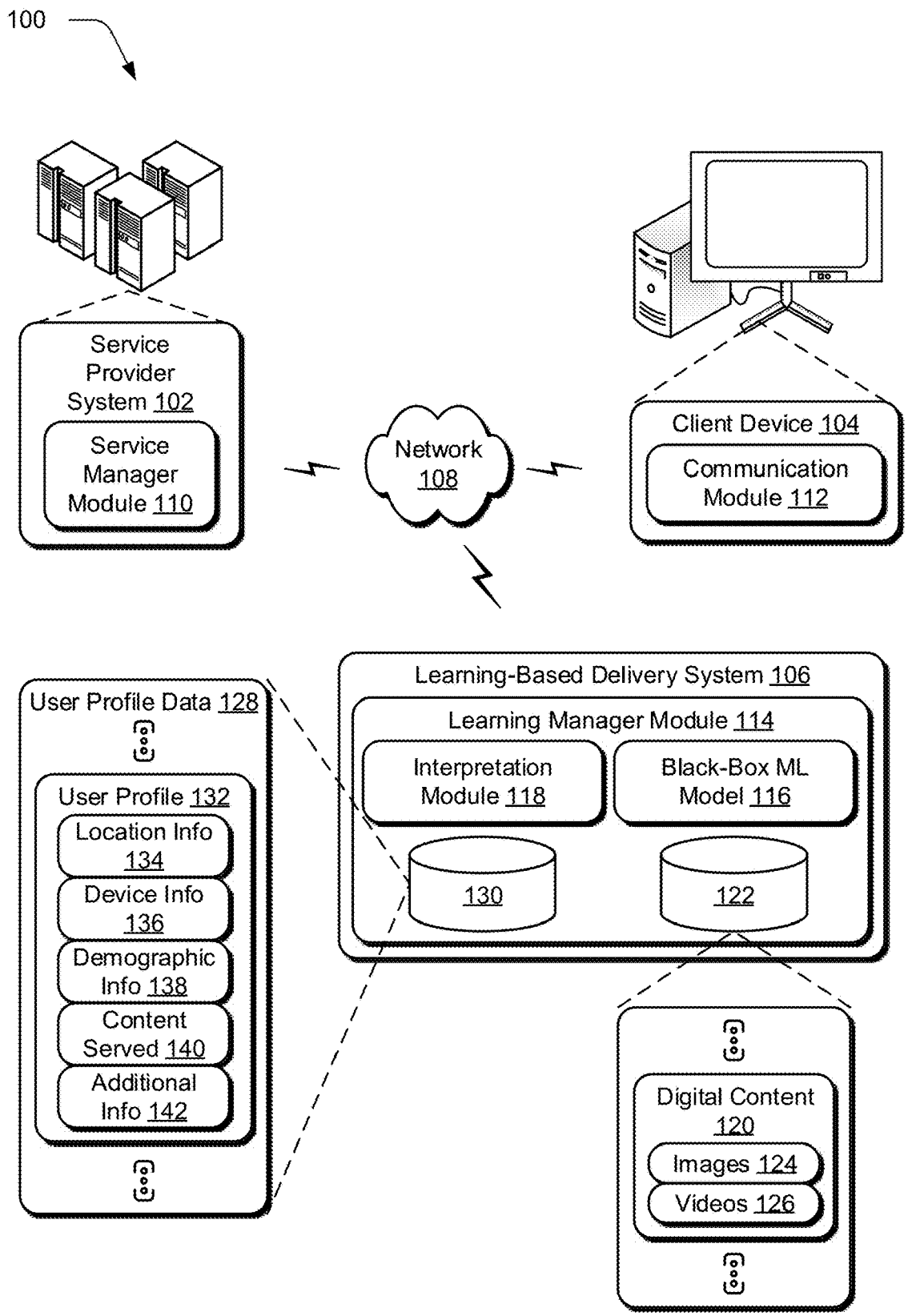
FIG. 1 is an illustration of an environment in an example implementation that is operable to employ techniques described herein.

Machine learning and artificial intelligence (AI) use in computing systems is becoming widespread. However, some types of machine learned models operate to produce outputs in a way that is not interpretable by humans. Such models may be considered "black boxes" insofar as the logic these models use during operation to produce outputs is largely not known. Examples of algorithms for implementing these models include neural networks, random forests, gradient boosted trees, and so forth. An advantage of these algorithms is that they are capable of modeling more complex patterns in data than algorithms that are generally human interpretable—linear regression, logistic regression, decision trees—and thus typically achieve higher accuracy in relation to most data sets than those human-interpretable algorithms. A lack of interpretability regarding how black-box models produce outputs can cause users to mistrust such models and also makes future planning in relation to outputs of the models difficult. Due to this lack of interpretability, some types of machine-learned models simply are not used for applications in which they may otherwise be useful.

To overcome these problems, rule determination for black-box machine-learning models is leveraged in a digital medium environment. Consider an example in which a black-box machine-learning model is used to classify client device users into different classes and in which different digital marketing content is served to different client device users according to the class indicated by the model. In this scenario, an interpretation system configured according to the described techniques determines rules, which are human interpretable and explain how this black-box machine-learning model classifies the different client device users into the different classes. These rules are human interpretable due, in part, to the format in which they are configured.

In particular, the rules determined by the interpretation system are formed as if-then statements that include an if-portion formed as a list of input attribute values that result in an observed output. These if-then statements also include a then-portion comprising an indication of the observed output that results from the input attribute values. With reference to the above-discussed user classification example, an if-then statement may be generated that includes an if-portion formed as a list of user characteristics (e.g., a particular age and a particular location) that result in one of the observed classifications. In this example, the one observed classification is indicated by the then-portion of the statement. An example of such a human-interpretable rule that is formed by the interpretation module as an if-then statement is 'IF $10 \leq age < 25$ AND state=California THEN Predict class_1'. Here, '$10 \leq age < 25$' and 'state=California' are the attribute values of the input that are combined, and 'class 1' is the observed output.

In accordance with the described techniques, the interpretation system determines these rules without knowledge of the logic a black-box machine-learning model uses in operation to associate the observed outputs of the model with inputs to the model. Indeed, the interpretation system does not know a type of the model (e.g., neural network, random forest, gradient boosted tree, etc.) or whether the black box comprises a single model or an ensemble of different machine-learned models. Instead, the interpretation system determines the rules from the mere inputs and outputs of the model. To this end, the interpretation system initially obtains data indicative of the inputs and observed outputs of the black-box machine-learning model. Based on this data, the interpretation system generates a proxy black-box model to imitate the behavior of the black-box machine-learning model. The proxy black-box model outputs probabilities for an instance of input data that the black-box machine-learning model associates the instance with each of the different outputs. Assume, for instance, that the black-box machine-learning model is observed to have four different outputs. In this example, the proxy black-box model outputs four probabilities in relation to a given instance of input data that indicate a probability the black-box machine-learning model associates each of the four different observed outputs with the given instance of input data. An observed output with the highest probability is considered to be the output the black-box machine-learning model associates with the input instance.

Broadly speaking, the actual black-box machine learning models deployed to provide services, e.g., to classify users into classes for targeted content delivery, image recognition, and so forth, are not used to determine a limited set of determinable rules for the system. This is because these models may be changed each day—the systems that deploys these models may train a new black-box machine-learning model and deploy the newly trained model on a daily basis. Accordingly, when the interpretation system is leveraged to determine rules of the black-box machine-learning model over some date range, there is thus generally behavior of more than one model to be analyzed. Nevertheless, the interpretation system is configured to provide a single set of rules for explaining the behavior of the black-box machine-learning model—the multiple models—over the entirety of the date range. To this end, the proxy black-box model is configured to imitate the behavior of the black-box machine-learning model over the course of the date range so that the interpretation system can determine rules over the entirety of the date range. In at least some scenarios, an ensemble of different machine learning models is deployed to provide services. In these scenarios, the proxy black-box model is effective to imitate the behavior of this combination of different models so that rules explaining behavior of the ensemble can be determined.

The interpretation system leverages the probabilities provided by the proxy black-box model to generate conditions for the observed outputs of the black-box machine-learning model. These conditions each include an indication of an attribute and a value or range of values of the attribute that results in an observed output. Using a genetic algorithm, the interpretation system combines these conditions to form candidate rules. These candidate rules are then filtered based on the techniques described in detail below to produce a subset of the rules, which is then output to describe the operation of the black-box machine-learning model. In one or more implementations, a top-k number of rules (e.g., Top-5 or user-selected number of rules) is output (e.g., displayed or audibly output) for presentation to a client device user. Alternately or in addition, the entire subset of rules may be inserted into a document (e.g., a spreadsheet) that a client device can present to a user.

Accordingly, the interpretation system supports several advantages. One advantage is that the interpretation system explains, via the rules, the operation of black-box machine-learning models in human-interpretable form. This is effective to enable humans (e.g., data analysts, marketers, system developers) to understand how black-box machine-learning models arrive at particular outputs given certain input data. Understanding how these black-box machine-learning models arrive at the outputs can be leveraged in a variety of scenarios. For instance, this understanding allows plans to be made regarding the output of a black-box machine-learning model, and thus predictable human instruments used in connection with systems incorporating these models, e.g., insurance agreements, contracts, laws, and so forth. Use of these instruments is largely not possible without transparency into how these models operate and without predictability with respect to the outputs they will produce. This understanding also enables debugging of these models. These rules allow a developer of such a model generally to determine from the rules why the model is producing a certain output when given a certain input. In scenarios where the output produced by the model is not the desired behavior, the developer can adjust data used to train the model (or add training data corresponding to the desired behavior), and retrain the model so that it behaves in the desired manner Indeed, the ability to interpret how black-box machine-learning models operate has a variety of advantages.

Term Descriptions

As used herein, the term "rule" generally refers to an if-then statement where an if-portion includes multiple attribute values joined by an AND-operator and where a then-portion corresponds to an observed output that holds true responsive to occurrence of the values indicated in the if-portion in an instance of data input to a model. The AND-operator is a conjunction between at least two attribute-values. By way of example, '10≤age<25' and 'state=California' are conditions that result in a model outputting an indication of a first content item, 'content_1', then a rule configured according to the describe techniques can have the format 'IF 10≤age<25 AND state=California THEN Predict content_1'.

As used herein and in connection with genetic algorithms, the term "individuals" refers to data structures for capturing the results of a genetic algorithm In one or more implementations, these individuals are configured as bit strings, where an activated bit indicates selection by the genetic algorithm of a selectable item, e.g., a condition (to form rules), a rule (to form a set of rules), and so forth.

As used herein and also in connection with genetic algorithms, the term "fitness function" refers to an objective function for evaluating a solution produced by a genetic algorithm in terms of one or more factors, such as precision and coverage of the solution. As used herein, "precision" refers to a correctness of a rule or set of rules, e.g., whether the rule or set correctly predict the observed outputs. The term "coverage" refers to an amount of the entire body of input data to which a rule or set of rules apply.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ rule determination for black-box machine-learning models as described herein. The illustrated environment 100 includes a service provider system 102, client device 104, and learning-based delivery system 106 that are communicatively coupled, one to another, via a network 108.

Computing devices that are usable to implement the service provider system 102, client device 104, and learning-based delivery system 106 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 6.

The service provider system 102 is illustrated as including a service manager module 110 that is representative of functionality to provide services accessible via the network 108 that are usable to make products or services available to consumers. The service manager module 110, for instance, may expose a website or other functionality that is accessible via the network 108 by a communication module 112 of the client device 104. The communication module 112, for instance, may be configured as a browser, a network-enabled application, and so on that obtains data from the service provider system 102 via the network 108. This data is employed by the communication module 112 to enable a user of the client device 104 to communicate with the service provider system 102 to obtain information corresponding to the products or services, e.g., web pages with new articles when the service provider system 102 is a news service.

In order to personalize the information for client device users, the service provider system 102 may employ a learning-based delivery system 106. Although functionality of the learning-based delivery system 106 is illustrated as separate from the service provider system 102, this functionality may also be incorporated as part of the service provider system 102, further divided among other entities, and so forth. The learning-based delivery system 106 includes a learning manager module 114 that is implemented at least partially in hardware of a computing device to generate black-box machine-learning model 116 and interpretation module 118, which represents functionality to determine rules for machine-learned models, e.g., the black-box machine-learning model 116. In one or more implementations, these rules are configured as if-then statements specifying data that a black-box model outputs given particular input data.

The black-box machine-learning model 116 is one example of a model for which the interpretation module 118 determines such rules. In one or more implementations, the black-box machine-learning model 116 represents functionality to deliver digital content 120 to client devices, which is illustrated as stored in storage 122, in an attempt to cause conversion of the client device users with the products or services of the service provider system 102. In accordance with the described techniques, the black-box machine-learning model 116 has learned to deliver the digital content 120 in a way that optimizes the conversion based on one or more machine learning techniques. For instance, the black-box machine-learning model 116 may comprise a neural network trained based on one or more loss functions and back propagation to optimize delivery of the digital content 120 to client devices in a way that maximize conversion.

The digital content 120 may assume a variety of forms, such as images 124, videos 126, and so forth. The learning-based delivery system 106 may deliver different images 124 or videos 126 to different client devices based on output of the black-box machine-learning model 116 that indicates which image 124 or video 126 to deliver—the output generated based on data describing associated client device users and machine learned "rules." The digital content 120, for instance, may be provided as part of a personalized user experience (e.g., digital marketing campaign, personalized web page, and so on) to client devices, including the client device 104. Data may then be generated based on the provision of the digital content 120 to describe which users received which items of the digital content 120 (e.g., in connection with particular personalized experiences) as well as characteristics of the users. This generated data may be included in user profile data 128, for example.

The user profile data 128 may also assume a variety of forms without departing from the spirit or scope of the techniques described herein. Broadly speaking, the user profile data 128, which is illustrated as stored in storage 130, describes characteristics of different client device users. This information can generally be used to tailor information provided to a client device based on particular characteristics of the associated client device user. To this end, the user profile data 128 is depicted with user profile 132, which represents a profile that includes data describing an individual client device user, e.g., a user authenticated to the client device 104. The illustrated example depicts the user profile 132 having location information 134 (e.g., GPS coordinates, IP address), device information 136 (e.g., device form factor, device operating system), demographic information 138 (e.g., age, gender, ethnicity), content served 140 (e.g., records of the digital content 120 that has been delivered to the user described by the user profile 132), and additional information 142 (e.g., income). User profiles may be configured to include or have access to different information without departing from the spirit or scope of the techniques described herein. The user profile data 128 is further illustrated with ellipses to indicate that the storage 130 is configured to store information for multiple users.

From the user profile data 128, the interpretation module 118 determines rules, which specify data that the black-box machine-learning model 116 outputs given particular input data. In general, the logic that machine-learned models use to determine which data to output is not known. This is because machine learned models are configured to learn through a training process—involving exposing the models to training data, comparing the output of the models to expected output, and providing feedback based on the comparison—how to determine (or generate) the data to output. This contrasts with algorithms that are programmed to perform an action based on occurrence of a condition (or multiple conditions). With these conditional algorithms, a developer knows, or can determine based on reviewing source code, why a computing device performs an action, e.g., due to a statement present in an algorithm instructing the computing device to perform the action responsive to detection of a triggering condition.

Consequently, the interpretation module 118 is configured to describe behavior of the black-box machine-learning model 116 without accessing code or an executable of the black-box machine-learning model 116. Instead, the interpretation module 118 determines rules indicative of the behavior by leveraging the inputs and outputs of the black-box machine-learning model 116. In particular, the interpretation module 118 leverages user information accessed by the black-box machine-learning model 116 as input and also information regarding the determined digital content 120 sent to users described by the information. In the context of the illustrated environment 100, the interpretation module 118 leverages the user profile data 128, which on a per-user basis includes descriptive attributes such as the location information 134, the device information 136, demographic information 138, and the additional information 142. The interpretation module 118 further analyzes this information in connection with indications of the digital content 120 selected for delivery to a particular user—as the user profile 132 also includes the content served 140 information describing the digital content 120 served to the user.

By determining if-then rules that are indicative of how a machine-learned model determines or generates output, the interpretation module 118 can provide at least some transparency and predictability regarding selections made or information generated as output of the machine learned model. An advantage of doing so is that users may become more comfortable with systems that leverage machine learning. Due to this increased comfort, users may be more willing to adopt technology built on machine learning, e.g., purchase devices or services that incorporate machine-learned models. Another advantage of this transparency is that it allows humans to make plans in relation to the technology. Consider an example in which a machine-learned model determines, based on a wealth of data describing a loan applicant, whether to deny or accept a loan application for an applicant. Given rules produces as if-then statements, the described techniques enable a loan officer to determine from limited information of an applicant's application if the applicant is likely to receive the loan. A further advantage of this transparency and predictability is that it allows systems incorporating machine learning (e.g., autonomous vehicles) to be governed, e.g., in connection with insurance agreements, laws, and so forth, in a way that is not possible without the transparency and predictability.

Having considered an example environment, consider now a discussion of some example details of the techniques for rule determination of black-box machine-learning models in a digital medium environment in accordance with one or more implementations.

Rule Determination for Black-Box Machine-Learning Models

Figure 2:
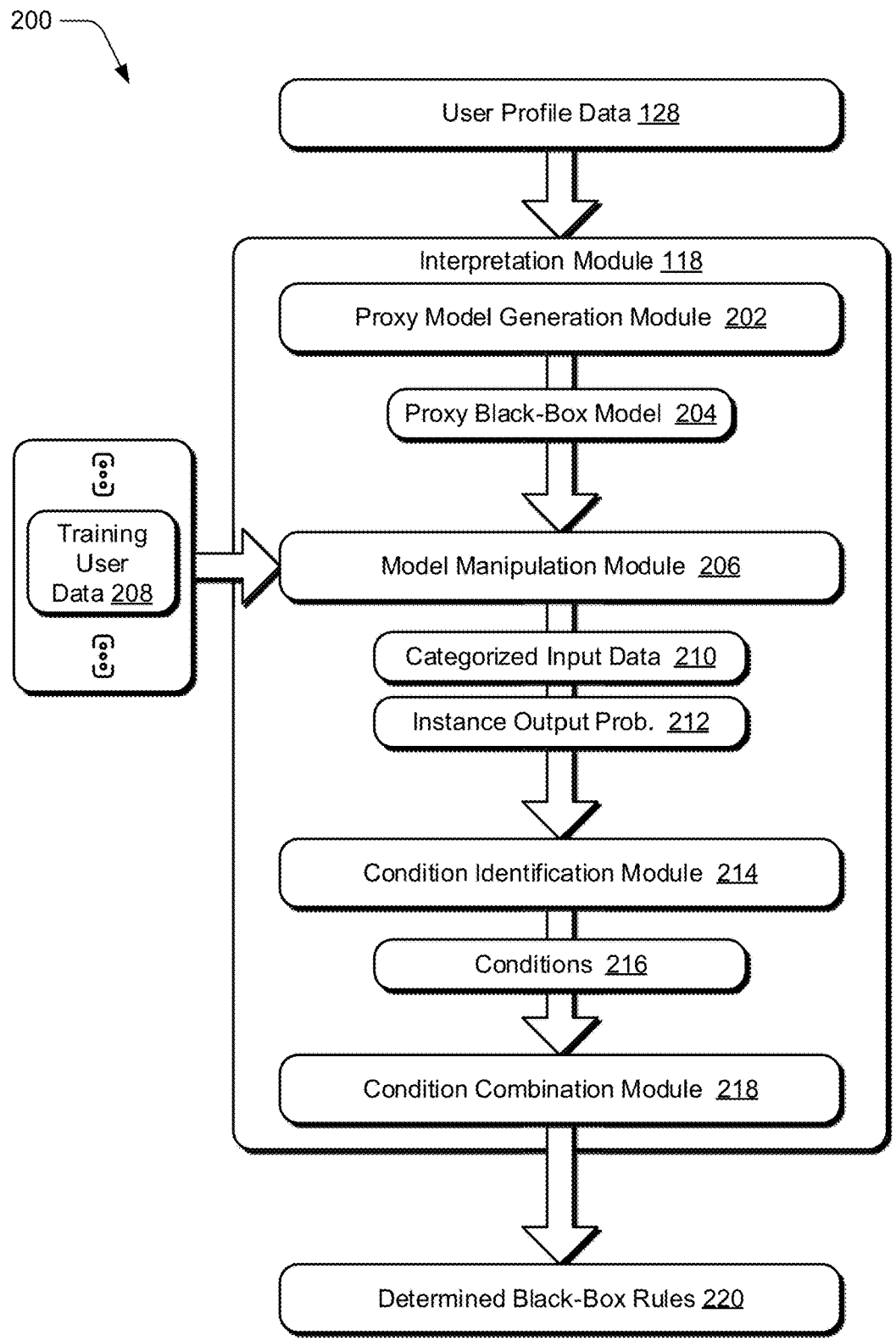
FIG. 2 depicts an example implementation in which a learning-based delivery system of FIG. 1 determines rules that describe operation of a machine-learned model.

FIG. 2 depicts an example implementation 200 in which a learning-based delivery system of FIG. 1 determines rules that describe operation of a machine-learned model. The illustrated example 200 includes from FIG. 1 the interpretation module 118, which is depicted obtaining the user profile data 128.

As indicated above, the user profile data 128 includes information describing client device users (e.g., the location information 134, device information 136, demographic information 138, etc.) as well as indications of the content served 140 to those users. The user profile data 128 thus includes both the data that is input to, and the data that is output from, the black-box machine-learning model for which the interpretation module 118 is determining rules. Leveraging the input and output data allows the interpretation module 118 to determine the rules for different types of black-box machine-learning models, such as classifiers, neural networks, regression-based models, genetic algorithms, and so forth. Further, the input and output data allows the interpretation module 118 to determine these rules for multi-model black-box configurations, such as an ensemble of black-box machine-learning models that are selectively leveraged based on characteristics of the input data and/or desired output.

The interpretation module 118 is illustrated having proxy model generation module 202. The proxy model generation module 202 represents functionality to generate proxy black-box model 204 from the user profile data 128. For instance, the proxy model generation module 202 generates the proxy black-box model 204 as a neural network or as an ensemble of different machine-learned models. As part of this, the proxy model generation module 202 trains the proxy black-box model 204 with the user profile data 128 to imitate the black-box machine-learning model for which the rules are being determined, e.g., the black-box machine-learning model 116. In one or more implementations, the proxy black-box model 204, once trained, is configured to receive an instance of user data as input and to output probabilities that the instance is associated with different observed outputs of the black-box machine-learning model 116, e.g., probabilities that a user, indicated by the instance data, is shown each different digital content 120 item of a particular marketing campaign. The observed output having a highest probability corresponds to the output of the black-box machine-learning model 116.

By way of example, the black-box machine-learning model 116 may be configured for classification to associate input instances with different classes (output of the model), such that some action can be taken in relation to an entity based on the class with which associated. In this example, classes may correspond to different content items of a digital marketing campaign and an input instance may correspond to data describing an individual client device user. Given this, the black-box machine-learning model 116 is configured to classify the client device user into a class, which corresponds to a particular one of the different content items, based on the input instance data. According to this classification, the particular content item is identified for delivery to the client device user. In contrast to the black-box machine-learning model 116, the proxy black-box model 204 is trained to output probabilities, e.g., probabilities that the black-box machine-learning model 116 associates each of the different classes with the client device user. The output of the proxy black-box model 204 can then be used to select the class having the highest probability. With reference to the continuing classification example, this selected class corresponds to the above-noted particular content item, which is the output of the black-box machine-learning model 116. Accordingly, the proxy black-box model 204 is trained to provide output that maps to the output of the black-box machine-learning model 116, given a same input instance.

In the illustrated example 200, the interpretation module 118 further includes model manipulation module 206, which represents functionality to manipulate the proxy black-model 204 once trained. For instance, the model manipulation module 206 is configured to modify the data input to the proxy black-box model 204 so that it can be used to determine rules indicative of how the black-box machine-learning model 116 operates. The model manipulation module 206 is depicted obtaining training user data 208, which is exposed to the proxy black-box model 204. Initially, the model manipulation module 206 pre-processes the training user data 208 to categorize the training user data 208, and thus produce categorized input data 210.

For attributes that are already categorical, the model manipulation module 206 leaves the data unmodified. An example of a categorical attribute is location, such as country. A location attribute with the granularity of country is already categorical because a client device is largely determined to be located in a single country at a given time. A client device may be associated with the country 'India,' for instance, based on current global positioning system (GPS) information. In contrast to such categorical attributes, some attributes are numerical and can span a range of numbers, e.g., age, income, and so on. The model manipulation module 206 is configured to preprocess such numerical attributes of the training user data 208 to form categories. In one or more implementations, the model manipulation module 206 forms categories using entropy-based binning to split a range of allowable values for an attribute into discrete bins, which each serve as a category. Consider an example in which age is an attribute that can have a value from 10 to 85 (inclusive). In this example, the model manipulation module 206 may use entropy-based binning to split the age attribute into three different categories, such that a first age category is defined for a range $10 \leq age < 25$, a second category for age is defined for a range $25 \leq age < 60$, and a third category for age is defined for a range 60 age 85.

The model manipulation module 206 provides the categorized input data 210 210 to the proxy black-box model 204 as input. In particular, the model manipulation module 206 forms training instances from the categorized input data 210, such that each training instance includes categorical values for the attributes considered. The model manipulation module 206 provides these instances as the input to the proxy black-box model 204. Consider an example in which age, income, and state are the attributes considered. In this example, the model manipulation module 206 may form an input instance having categorical values such as '$10 \leq age < 25$', '$100 \leq income < 200$', and 'state=California'. Based on receiving these instances as input from the model manipulation module 206, the proxy black-box model 204 outputs instance output probabilities 212.

With reference to a single input instance of the training user data 208, the instance output probabilities 212 include a probability determined for each observed output of the black-box machine-learning model 116—the observed outputs determined from the user profile data 128. In other words, for the single input instance, the proxy black-box model 204 outputs a set of probabilities—a value for each observed output that indicates a probability the black-box machine-learning model 116 associates that output with the single input instance. Further, the proxy black-box model 204 is configured to output a set of these probabilities for each instance of the training user data 208 input to the proxy black-box model 204. One example of this is probabilities that the black-box machine-learning model 116 associates a user, indicated by an input instance of data, with each different digital content 120 item of a particular marketing campaign. As noted above, the observed output with a highest probability represents the output of the black-box machine-learning model 116.

Based on the instance output probabilities 212, condition identification module 214 generates conditions 216. To generate the conditions 216, the condition identification module 214 iterates over the instances of the training user data 208 input to the proxy black-box model 204 and references the instance output probabilities 212. When iterating over these instances, the condition identification module 214 determines a contribution of different values of the categorical attributes in arriving at the observed outputs. In one or more implementations, the condition identification module 214 determines a marginal contribution of different values.

Consider again an example in which input instances have categorical attributes of age, income, and location (state in this example) and in which at least one input instance has categorical values of '$10 \leq age < 25$', '$100 \leq income < 200$', and 'state=California'. Also assume that the observed outputs in this example are two different configurations of a content item, e.g., a first content item (content_1) and a second content item (content_2). Accordingly, the proxy black-box model 204 outputs probabilities for each of the first and second content items, such as a probability of 69% the black-box machine-learning model 116 associates the example instance with the first content item and a probability of 31% the black-box machine-learning model 116 associates the example instance with the second content item. This may be notated as '(0.69, 0.31)' with a variablelevel notation configured as '(content_1, content_2)'. Regardless, the condition identification module 214 is configured to iterate over each instance of the training user data 208 to determine a contribution of the value '10≤age<25' for age in arriving at the first content item. The condition identification module 214 also iterates over the input instances of the training user data 208 to determine a contribution of the value 'state=California' for location in arriving at the first content item.

The condition identification module 214 uses the instance output probabilities 212 to compute the contributions of the different values of the categorical attributes to the observed outputs. In one or more implementations, the condition identification module 214 is configured to perturb each instance of the training user data 208 and train a locally faithful linear model in the locality of the given instance. From this, the condition identification module 214 determines weights of the different category values, e.g., a weight of 'state=California' in arriving at the first content item. The condition identification module 214 then uses these weights as the marginal contribution values for the categorical attributes' different values.

In one or more implementations, the condition identification module 214 iterates over selective input instances of the training user data 208 rather than iterate over each input instance. This increases an efficiency with which the condition identification module 214 determines the contributions of the categorical attributes' different values. In particular, the condition identification module 214 determines the contributions for instances having same attribute values once, such that one of the input instances having particular attribute values is processed by the condition identification module 214. Any other input instances having those particular attribute values are not processed for computing contributions of the values to the observed outputs.

In at least some scenarios, the condition identification module 214 computes the contributions (as weights) for a first encountered instance having particular attribute values. For each subsequently encountered instance, the condition identification module 214 determines whether any input instance having the same attribute values has already been processed. If it is determined that the condition identification module 214 has already computed contributions for an input instance having the same attribute values as this subsequently encountered instance, then the condition identification module 214 does not the compute attribute-value contributions for the subsequently encountered instance. If it is determined that the condition identification module 214 has not already computed contributions for an instance having the same attribute values as this subsequently encountered instance, however, then the condition identification module 214 does compute the attribute-value contributions for the subsequently encountered instance.

For example, the condition identification module 214 determines value contributions for a single input instance having attributes with the values '10≤age<25', '100≤income<200', and 'state=California'. Once contributions of these values are determined for this instance, though, the condition identification module 214 does not determine value contributions for other input instances having attributes with the values '10≤age<25', '100≤income<200', and 'state=California'. This increases an efficiency of generating the conditions 216 in relation to a process that involves computing the contributions for each instance. This is in part because certain values and combinations of these values—resulting in input instances having same attribute values—may be common in the user profile data 128. Regardless, the condition identification module 214 outputs the conditions 216 based on these contribution computations. Broadly speaking, the illustrated conditions 216 represent a list of conditions where a condition comprises a single attribute and a value (for categorical attributes) or a range of values (for categorized numerical attributes).

The illustrated example 200 further includes condition combination module 218, which represents functionality to generate determined black-box rules 220, in part, by combining the conditions 216. In accordance with the techniques described herein, a "rule" is an if-then statement where the if-portion includes multiple attribute values joined by an AND-operator and where the then-portion corresponds to an observed output that holds true responsive to the occurrence in an instance of the values indicated in the if-portion. The AND-operator is a conjunction between at least two attribute-values. By way of example, if the condition combination module 218 determines that '10≤age<25' and 'state=California' are conditions for the first content item, then one candidate rule is generated having a format of 'IF 10≤age<25 AND state=California THEN Predict content_1'.

To generate the determined black-box rules 220, the condition combination module 218 is capable initially of combining conjunctions of the conditions 216 that hold true to generate candidate rules—formed as the if-then statements discussed above. As discussed in more detail below, a limited set of the candidate rules that can be generated are ultimately selected as the determined black-box rules 220. In addition to forming these candidate rules, the condition combination module 218 is configured to compute a precision measure and coverage measure for each generated rule. The precision measure of a rule $R_i$ is indicative of correctness of the rule over an entirety of the training user data 208. In one or more implementations, the condition combination module 218 computes the precision measure according to the following:

$$\text{Precision}(R_i) = \frac{\text{len}(\text{correct-cover}(R_i))}{\text{len}(\text{cover}(R_i))}$$

Here, the term correct-cover($R_i$) represents a set of instances in which the rule $R_i$ correctly indicates the observed output. Formally, correct-cover($R_i$) represents a set of instances $x_i$ such that $x_i$ is in the cover($R_i$) and the predicted label $y_i$ of the rule matches the observed output prediction by the proxy black-box model 204 for the instance $x_i$. With reference to the above-discussed example, the predicted labels include 'content_1' and 'content_2'. In contrast, the term cover($R_i$) represents a set of instances the rule $R_i$ covers in the training user data 208. These are instances for which the conditions of $R_i$ are true, e.g., instances having values that match the if-portion of $R_i$, regardless of a value of the then-portion (which may or may not match the rule $R_i$).

Further, the length of the rule $R_i$, referred to in the following discussion also as 'len', corresponds to a cardinality of a pre-condition $C_i$ set for the rule. As noted above, a condition $C_i$ is a combination of an attribute and an allowable category value or range of values the attribute can take, such as '10≤age<25' or 'state=California'. In one or more implementations, the condition combination module 218 computes the length according to the following:

$$\text{Length}(R_i) = \text{number of conditions in } R_i$$

Turning now to a discussion of the coverage measure in accordance with the described techniques. The coverage measure of a rule $R_i$ indicates an amount that a given output of the proxy black-box model 204 is accounted for by the rule. For instance, the coverage measure is configured to indicate how much of the training data, associated with the example 'content_1' (associated due to content_1 having a highest computed probability for a respective input instance), is accounted for by the rule $R_i$. In one or more implementations, the condition combination module 218 computes the coverage measure according to the following:

$$\text{Output-Coverage}(R_i) = \frac{\text{len}(\text{correct-cover}(R_i))}{\text{\# of instances in training data having predicted label } y_i}$$

Here, the condition combination module 218 determines the number of instances in the training user data 208 that have the predicted label $y_i$. By "having the predicted label" it is meant that the predicted label, which corresponds to one of the observed outputs, is associated with the highest computed probability for an instance in relation to the other labels (other possible observed outputs). Consider again the example in which the observed outputs are solely a first content item and a second content item, having labels 'content_1' and 'content_2', respectively. An instance is said to "have the predicted label" of 'content_1' when the computed probability for the instance of being associated with content_1 is greater than the computed probability for the instance of being associated with content_2, such as when the probability of being associated with content_1 is 69% and the probability of being associated with content_2 is 31%. In this scenario, the instance is said to have the label 'content_1'.

In one or more implementations, the condition combination module 218 generates the determined black-box rules 220—a subset of the possible candidate rules—to be suitably precise and have suitable coverage, as indicated by the precision and coverage measures. Indeed, the condition combination module 218 may optimize the rule generation, such as to result in highest measures of precision and coverage. Rather than have a single predefined notion of optimality, the condition combination module 218 may be configured to take a notion of optimality as input, such as input that indicates to generate rules to obtain a highest measure of coverage (without regard for precision), to generate rules to obtain a highest measure of precision (without regard for coverage), to generate rules to obtain some combination of coverage and precision, to generate rules based on some other notion of optimality (e.g., fastest computation time), and so forth.

Additionally, the condition combination module 218 is configured to generate rules that include more than one categorical value for an attribute. Thus, the condition combination module 218 is configured to combine not only the 'AND's of the conditions 216, but also the 'OR's within a condition involving a categorical attribute so that it allows the attribute to take on multiple possible values. Consider an example in which there is a categorical attribute for country and in which '10≤age<25', 'country=US', and 'country=India' are conditions for the first content item. Then the condition combination module 218 is capable of forming a candidate rule, such as the following to cover this scenario: 'IF 10≤age<25 AND country=US, India THEN Predict content_1'.

To generate the determined black-box rules 220 so that they are suitably precise and also have suitable coverage, the condition combination module 218 employs a genetic algorithm in one or more implementations. In particular, the condition combination module 218 employs the genetic algorithm to learn these suitably precise and covering black-box rules given the conditions 216. In so doing, the condition combination module 218 deploys the genetic algorithm in relation to each observed output—in a classification scenario, each observed output corresponds to a class. In this way, the condition combination module 218 learns observed-output-level rules, e.g., rules on a per output basis for each output of the outputs observed.

In connection with deploying the genetic algorithm, the condition combination module 218 generates data structures to capture results of the genetic algorithm. These data structures may generally be referred to as "individuals." In the discussion, however, these data structures are referred to as candidate-rule data indications. In one or more implementations, the condition combination module 218 configures these candidate-rule indications as bit strings that represent candidate rules determined by the genetic algorithm. Further, the condition combination module 218 generates these candidate-rule indications to have a number of bits that correspond to a number of the conditions 216 generated. For example, if the condition identification module 214 generates 100 of the conditions 216 then each of the candidate-rule indications is configured as a bit string having a length of 100 bits.

Given this, consider an example in which the genetic algorithm deployed by the condition combination module 218 in relation to a first observed output (e.g., 'content_1') produces a candidate-rule indication of '100100000 . . . 000'. This example candidate-rule indication indicates a rule comprising a conjunction of a first and fourth of the conditions 216, which may be represented as 'condition1' and 'condition4', respectively. From a candidate-rule indication, the condition combination module 218 can produce a corresponding if-then statement. Given the example candidate-rule indication, the condition combination module 218 produces the statement 'IF condition1 AND condition4 THEN Predict content_1'. The condition combination module 218 further configures the candidate-rule indications so that conditions corresponding to categorical attributes (e.g., country) are allowed to have more than one value (e.g., 'US' or 'India').

In general, deployment of a genetic algorithm involves specifying at least one "fitness function" to evaluate each solution—a set of candidate-rule indications—produced by the genetic algorithm. To this end, the condition combination module 218 is configured to evaluate solutions produced by the deployed genetic algorithms based on one or more measures of solution fitness, e.g., fitness functions. Based on these evaluations, the condition combination module 218 selects a solution to serve as a basis for the determined black-box rules 220. The condition combination module 218 generates the determined black-box rules 220 from the candidate-rule indications of selected solutions. In one or more implementations, the condition combination module 218 measures the fitness of genetic algorithm solutions, at least in part, according to the following fitness function:

$$F1\text{-Score}(R_i) = \frac{2 \times \text{Precision}(R_i) \times \text{Output-Coverage}(R_i)}{\text{Precision}(R_i) + \text{Output-Coverage}(R_i)}$$

As noted above, the Output-Coverage ($R_i$) is a measure of coverage that the rule $R_i$ provides with respect to one of the observed outputs and the term Precision($R_i$) represents a measure of correctness of the rule $R_i$ over an entirety of the training user data 208. Here, the fitness measure F1-Score ($R_i$) computed using the above-noted fitness function corresponds to a harmonic mean of the precision measure Precision($R_i$) and the coverage measure Output-Coverage ($R_i$). This fitness measure indicates the fitness of a solution solely in terms of the solution's precision and coverage; this measure does not indicate the fitness in terms of other factors.

In one or more implementations, the condition combination module 218 may also measure a solution's fitness in terms of other factors, such as length and overlap. Broadly speaking, the condition combination module 218 uses a length factor in connection with the fitness measure to award rules having relatively shorter lengths (e.g., fewer conditions conjunctively joined) in relation to rules having greater lengths (e.g., more conditions conjunctively joined). Due to this, the condition combination module 218 can output rules having shorter lengths than if the length factor is not utilized. One advantage of relatively shorter rules is that shorter rules are more easily interpreted by humans than longer rules. Accordingly, the presentation of these rules with relatively shorter lengths enables client device users to more easily understand how the black-box machine-learning model 116 operates.

The condition combination module 218 is further configured to resolve rule overlap, which occurs when conjunctions of the same conditions comprise rules for different observed outputs, e.g., in a scenario where a conjunction of conditions comprises a rule for content_1 and the same conjunction of conditions comprises a rule for content_2. In accordance with the described techniques, only one such rule is correct. The condition combination module 218 reduces ambiguity in the determined black-box rules 220 by resolving this rule overlap. To resolve such overlap, the condition combination module 218 is configured to increasingly optimize the rules for precision (e.g., over coverage), as optimizing for greater precision results in selecting rules that correctly copy behavior of the black-box machine-learning model 116, as indicated by the precision measure.

To account for each of the precision and coverage, rule length, and overlap, the condition combination module 218 evaluates solutions produced by the deployed genetic algorithms using a fitness function that accounts for each of these factors. In one or more implementations, the condition combination module 218 measures the fitness of solutions produced by the genetic algorithm according to the following fitness function:

$$F(\text{crind}) = F1\text{-Score}(R_i) - \frac{\text{\# of active bits in crind}}{N}$$

Here, the term 'crind' represents one of the candidate-rule indications produced by the genetic algorithm—formed as the above-discussed bit string. Further, the rule $R_i$ is the rule represented by the candidate-rule indication crind. The term N represents a length of the bit string and thus also corresponds to a number of the conditions 216 generated by the condition identification module 214. The term '# of active bits in crind' represents a number of bits that indicate a condition included as part of the rule $R_i$—in other words a number of conditions in the rule.

The condition combination module 218 is configured to deploy the genetic algorithm for a number of iterations, e.g., which are generally referred to as "generations" in relation to genetic algorithms. The condition combination module 218 uses the candidate-rule indications produced by the genetic algorithm in a last generation as a rule set for one of the observed outputs. The condition combination module 218 deploys the genetic algorithm for multiple iterations in relation to each of the observed outputs to produce a respective rule set. The condition combination module 218 may discontinue this iterative production based on the fitness measure, such as when the fitness measure reaches a suitable threshold.

After a respective rule set is generated for each observed output, the condition combination module 218 filters these rules to remove at least some of them. For example, the condition combination module 218 removes redundant rules from the entire set of rules that is generated over the observed outputs with the genetic algorithm In one or more implementations, the condition combination module 218 initially sorts the genetic-algorithm generated rules in descending order of precision, as indicated by the precision measure. The condition combination module 218 then iterates down the sorted list of rules. For each rule, the condition combination module 218 checks whether the rule is a subset of a more precise rule already added to a unique rule list. If a currently considered rule is not a subset of a more precise rule already added, then the condition combination module 218 adds the currently considered rule to the unique rule list. If the currently considered rule is a subset of a more precise rule already added, however, then the condition combination module 218 leaves the currently considered rule off the unique rule list. The condition combination module 218 then considers a next rule from the precision-sorted list of rules. By "subset" it is meant that the group of rules $R_2$ is a subset of the group of rules $R_1$ if each instance of input data correctly covered by the group of rules $R_2$ is also correctly covered by the group of rules $R_1$.

In one or more implementations, the condition combination module 218 further selects, from the unique rule list, a subset of rules in relation to each of the observed outputs to describe behavior of the black-box machine-learning model 116 for that observed output. The condition combination module 218 may select a subset of rules in relation to each of the observed outputs based on different selection techniques. The selection technique used to select these subsets may be based, in part, on user input indicating a preference for one of different optimization bases. Alternately or in addition, the condition combination module 218 may use a particular one of the selection techniques based on configuration settings. By way of example, the different selection techniques may select rules to optimize coverage of the selected rules, optimize the above-noted F1-score of the selected rules, optimize a second-level genetic algorithm with the selected rules, and so forth.

An example selection technique that optimizes coverage of the selected rules is configured to optimize observed-output-level coverage. In one or more implementations, the condition combination module 218 provides a coverage threshold and the pre-filtered rules corresponding to one of the observed outputs as input to a coverage-optimizing selection algorithm By way of example, a coverage threshold may be set at 90% if a high level of coverage by the selected rules is desired. In accordance with this algorithm, the condition combination module 218 sorts the pre-filtered rules corresponding to the one observed output in descending order of precision. The condition combination module 218 then iterates through the rules, beginning with the most precise rule. Each of the rules considered is added to a set of final rules for the one observed output until the coverage threshold is obtained. When the coverage threshold is obtained, the condition combination module 218 ceases considering the pre-filtered rules for the one observed output. The condition combination module 218 employs this coverage-optimizing selection algorithm in relation to each of the observed outputs and combines the final lists of rules produced thereby to form the determined black-box rules 220.

An example selection technique that optimizes the fitness measure (e.g., the F1-score) is configured to select an optimal subset of rules for each one of the observed outputs. In one or more implementations, the condition combination module 218 provides the pre-filtered rules corresponding to one of the outputs as input to a fitness-optimizing selection algorithm In accordance with the fitness-optimizing selection algorithm, the condition combination module 218 selects an optimal subset of the rules using a bottom-up, dynamic approach. Initially, the condition combination module 218 analyzes a single rule. For each subsequent iteration, the condition combination module 218 increments a number of rules analyzed one by one. Given this, there is a new rule to be analyzed at each iteration.

For each iteration, there is thus the new rule to be analyzed and an optimal subset of rules analyzed in a previous step. This optimal subset does not include each of the rules analyzed. Rather, the optimal subset includes solely rules that the condition combination module 218 determines to retain based on the analysis. In one or more implementations, the condition combination module 218 performs the analysis to determine whether the new rule considered in a current iteration is to be added to the optimal subset or not. To make this determination, the condition combination module 218 computes a fitness measure (e.g., the above noted F1-score) for two different subsets of rules, one subset of rules that includes the new rule being considered and one subset that does not include this new rule. The condition combination module 218 retains the subset having a higher fitness measure (a higher F1-score). A higher fitness measure is indicative of a better fitness of the subset of rules as describing the behavior of the black-box machine-learning model 116 than a lower fitness measure. In one or more implementations, the condition combination module 218 is further configured to control a size of optimal subset. In these implementations, the condition combination module 218 limits a number of rules in a subset to a predefined number, such as one defined according to user input to set the predefined number.

An example selection technique that selects the rules based on optimization of a second-level genetic algorithm is deployed at a per observed-output level. In a similar manner as with the previously discussed genetic algorithm, the condition combination module 218 generates data structures to capture results of the second-level genetic algorithm In the context of genetic algorithms, generally, these data structures are referred to as "individuals." In the following discussion, however, the data structures produced in connection with the second-level genetic algorithm are referred to as selected-rule indications. In accordance with the described techniques, the selected-rule indications are bit strings having a number of bits equal to a number of rules remaining after the rules generated by the previous genetic algorithm are filtered, e.g., to remove redundant rules. In this context, a selected-rule indication with a bit string '1100000 . . . 00' corresponds to a rule set for which only the first rule $R_1$ and the second rule $R_2$ are selected. This rule set covers each of the instances covered by $R_1$ and $R_2$. In any case, the condition combination module 218 is configured to deploy the second-level genetic algorithm to select rules and evaluates its solutions with a set-fitness measure. In one or more implementations, the condition combination module 218 computes the set-fitness measure according to the following:

$$F1\text{-Score}(\mathbb{R}) = \frac{2 \times \text{Precision}(\mathbb{R}) \times \text{Output-Coverage}(\mathbb{R})}{\text{Precision}(\mathbb{R}) + \text{Output-Coverage}(\mathbb{R})}$$

Here, the term $\mathbb{R}$ represents a rule set including rules of the form $R_i$ and is capable of being represented by a selected-rule indication. The terms Precision($\mathbb{R}$) and Output-Coverage($\mathbb{R}$) correspond to a measure of precision of the rule set and a measure of coverage of the rule set across the observed outputs, respectively. In one or more implementations, the condition combination module 218 computes the precision measure for a rule set according to the following:

$$\text{Precision}(\mathbb{R}) = \frac{\text{len(correct-cover}(\mathbb{R})))}{\text{len(cover}(\mathbb{R}))}$$

Here, the term correct-cover($\mathbb{R}$) represents the union of the correct covers of $R_i$ for each rule in the set of rules $\mathbb{R}$. Further, the term cover($\mathbb{R}$) represents the covers (not the correct covers) of $R_i$ for each rule in the set of rules $\mathbb{R}$. The cover and correct cover of $R_i$ are described above in the discussion of the initial genetic algorithm Turning now to the measure of coverage of the rule set across the observed outputs in accordance with the described techniques. In one or more implementations, the condition combination module 218 computes the coverage measure for a rule set according to the following:

$$\text{Output-Coverage}(\mathbb{R}) = \frac{\text{len(correct-cover}(\mathbb{R}))}{\text{\# of instances in training data having predicted label } y_i}$$

Here, the term $y_i$ represents the observed output that the rules in the set of rules $\mathbb{R}$ predict. Regardless of the particular selection technique employed, the condition combination module 218 selects from the filtered rules to obtain an optimized subset of the rules, which are output as the determined black-box rules 220.

In one or more implementations, the condition combination module 218 sorts the selected rules so that the determined black-box rules 220 are output with more relevant rules listed before less relevant rules. The condition combination module 218 is configured to make a determination of relevancy based on a fitness measure, e.g., the F1-Score. To sort the rules, the condition combination module 218 selects, for a first position in the list, a selected rule having the best fitness measure, e.g., the highest F1-score. The condition combination module 218 then iterates over the remaining selected rules to determine which selected rule improves the fitness measure the most, e.g., which selected rule increases the F1-score the most. This determined rule is added to a second position in the list. The condition combination module 218 continues this operation until each of the selected rules is added to a position in the list. As a result of this, the determined black-box rules 220 comprise a sorted list of the rules. These rules can then be output via a client device for presentation to a user. In this context, consider FIG. 3.

Figure 3:
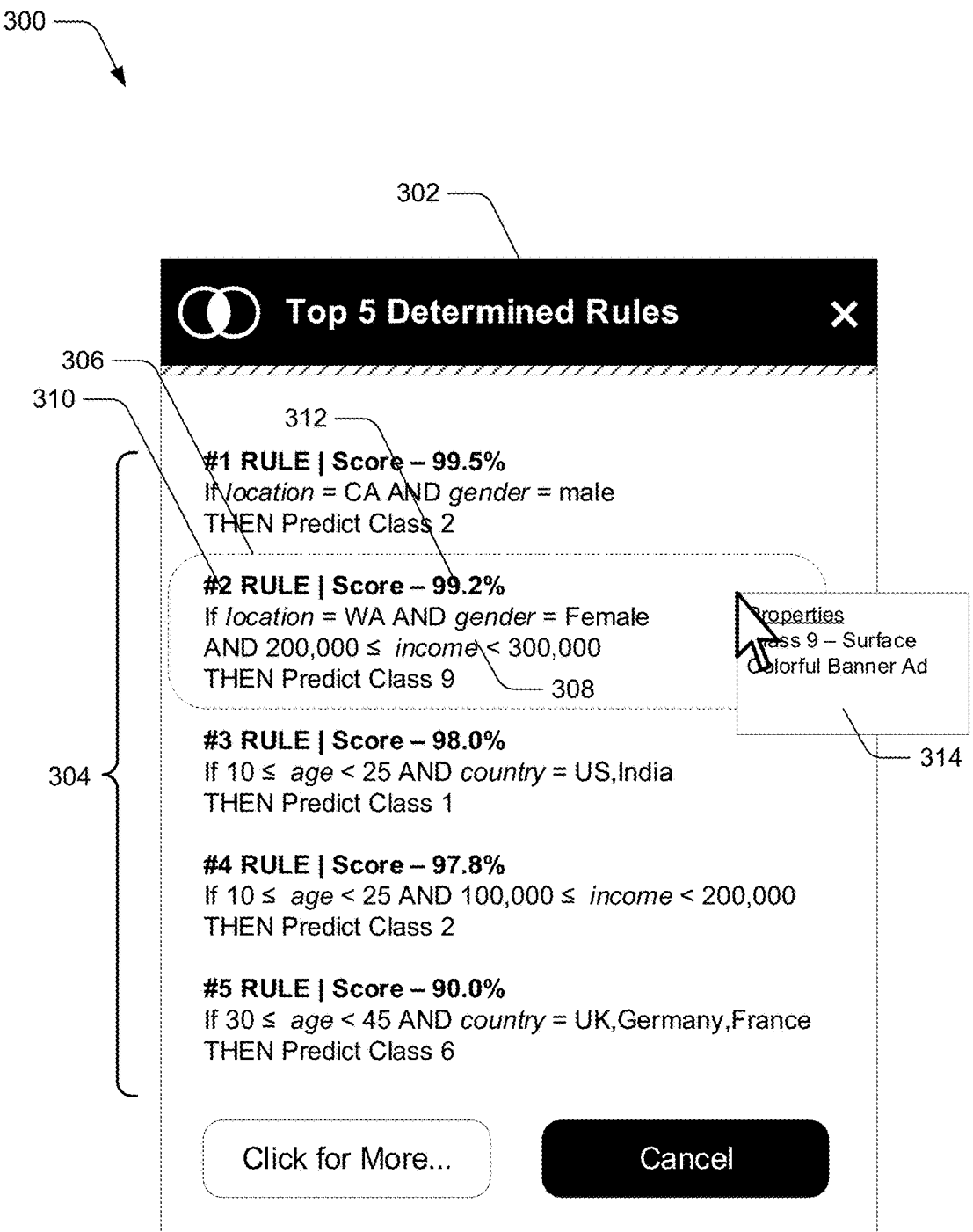
FIG. 3 depicts an example user interface configured to present determined rules for a black-box machine-learning model.

FIG. 3 depicts an example user interface 300 that is configured to present determined rules for a black-box machine-learning model. The illustrated example 300 includes rule-presentation interface 302, which is depicted as a displayable dialog box, though other configurations are contemplated in the spirit or scope of the techniques described herein.

In accordance with the described techniques, the rule-presentation interface 302 is generated to present one or more of the determined black-box rules 220. For instance, the client device 104 displays the rule-presentation interface 302 to present the one or more determined black-box rules 220 included in the interface. In the illustrated example 300, for instance, the rule-presentation interface 302 is depicted displaying the "Top-5" determined black-box rules 220. These may be identified as the "Top-5" determined black-box rules 220 according to the sorting described above. It should be appreciated that a rule-presentation interface may be configured to present a different number of rules than five without departing from the spirit or scope of the techniques described herein. Indeed, a rule-presentation interface may be configured to present the Top-k rules, where k is any number of rules greater than zero and up to a number of the determined black-box rules 220.

The determined black-box rules 220 may be output in different ways without departing from the spirit or scope of the techniques described herein. For example, the learning-based delivery system 106 may format and insert each of the determined black-box rules 220 into a spreadsheet or comma separated value ("CSV") document. The client device 104 may then display the spreadsheet or CSV document with each of the determined black-box rules 220 for presentation to a client device user. Alternately or in addition, the client device 104 may be configured to output the determined black-box rules 220 in other ways, such as audibly via one or more speakers associated with the client device 104. Due to the configuration as the described if-then statements, the output rules are human interpretable, regardless of how specifically the rules are output.

The illustrated example 300 also depicts a variety of information being presented with presented rules 304. In addition to the if-then statements, the rules may be presented with other information without departing from the spirit or scope of the described techniques. In this context, consider the second-ranked rule 306. In addition to rule statement 308 (configured in accordance with the if-then format described above), the second-ranked rule 306 is depicted with ranking 310 and fitness score 312. The ranking 310 is indicative of the rule's position in the list of sorted determined black-box rules b 220 e.g., that are sorted as described above. The fitness score 312 is indicative of a fitness measure computed for each of the rules. In one or more implementations, the fitness score 312 corresponds to an F1-Score computed as described above for the second-ranked rule 306—this score may also be used in connection with sorting the rules.

The rule-presentation interface 302 is also depicted with a rule properties box 314, which may include properties of the rule relative to which the rule properties box 314 is displayed. Such properties may include an indication regarding what a predicted class corresponds to (in a scenario where the black-box machine-learning model 116 classifies input instance). By way of example, the indication may indicate that prediction as part of a class results in delivery of particular content. With reference to the illustrated example 300, the properties box indicates that a prediction of 'Class 9' for a client device user results in 'Colorful Banner Ad' being surfaced for the client device user. Indeed, rankings, fitness scores, and properties may be presented in connection with respective rules in accordance with one or more implementations. However, it should be appreciated that the determined black-box rules 220 may be presented in different ways and/or with different information without departing from the spirit or scope of the techniques described herein.

Having discussed example details of the techniques for rule determination for black-box machine-learning models, consider now some example procedures to illustrate additional aspects of the techniques.

Example Procedures

This section describes example procedures for rule determination for black-box machine-learning models in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the learning-based delivery system 106 of FIG. 1 that makes use of a learning manager module 114, including use of its interpretation module 118.

Figure 4A:
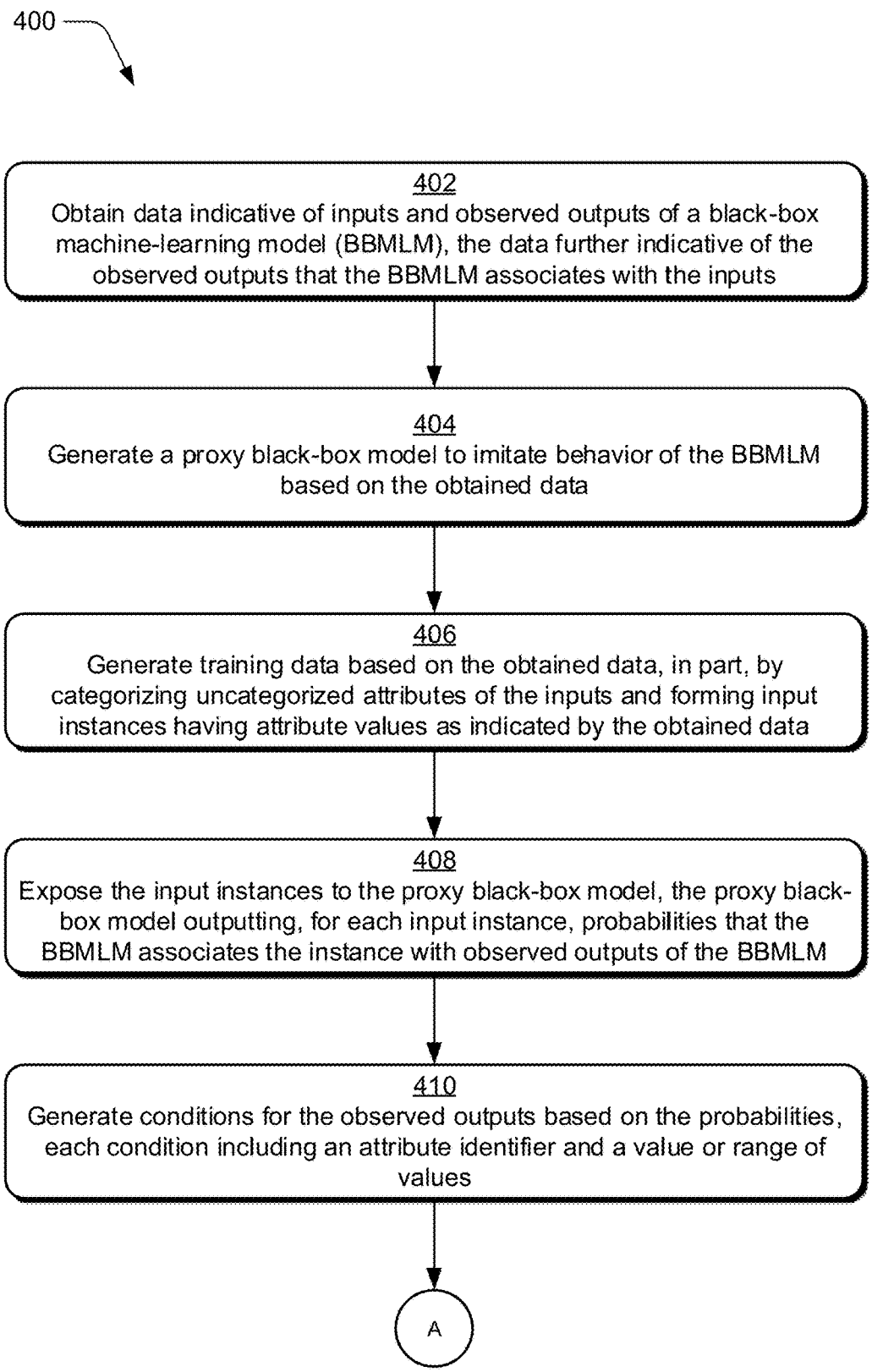

FIGS. 4A and 4B depict an example procedure 400 in which rules are determined that describe operation of a black-box machine-learning model. Data indicative of inputs and outputs of a black-box machine-learning model is obtained (block 402). In accordance with the principles described herein, the data is further indicative of the outputs that the black-box machine-learning model associates with the inputs. By way of example, the interpretation module 118 obtains the user profile data 128. The user profile data 128 includes data indicative of inputs to the black-box machine-learning model 116, e.g., the location information 134, the device information 136, the demographic information 138, and the additional information 142. The user profile data 128 also includes data indicative of the outputs observed from the black-box machine-learning model 116. Further, the user profile data 128 includes the content served 140, which comprises data indicative of the outputs that the black-box machine-learning model 116 associates with an instance of input, e.g., a particular user profile 132.

A proxy black-box model is generated to imitate behavior of the black-box machine-learning model based on the obtained data (block 404). By way of example, the proxy model generation module 202 generates the proxy black-box model 204 based on the obtained user profile data 128 to imitate the black-box machine-learning model 116.

Training data is generated based on the obtained data (block 406. In accordance with the principles discussed herein, the training data is generated, in part, by categorizing uncategorized attributes of the inputs and by forming input instances having attribute values as indicated by the obtained data. By way of example, the training user data 208 is generated based on the data obtained at block 402. The model manipulation module 206 categorizes uncategorized attributes of the training user data 208 to produce the categorized input data 210. For instance, the model manipulation module 206 converts an allowable range of values for numerical attributes (e.g., income, age, and so on) to categorical attributes. In one or more implementations, the model manipulation module 206 converts these attributes into categorical attributes using entropy-based binning. The model manipulation module 206 also forms input instances having attribute values as indicated by the data obtained at block 402. In so doing, the model manipulation module 206 selects a finite set of attributes for the instances and sets attribute values according to this obtained data.

The input instances are exposed to the proxy black-box model (block 408). In accordance with the principles discussed herein, the proxy black-box model outputs, for each instance, probabilities that the black-box machine-learning model associates the instance with the observed outputs of the black-box machine-learning model. By way of example, the model manipulation module 206 exposes the input instances formed at block 406 having the categorized input data 210 to the proxy black-box model 204. The proxy black-box model 204 outputs the instance output probabilities 212. The instance output probabilities 212 include, for each input instance, probabilities that the black-box machine-learning model 116 associates the instance with each observed output of the model.

Conditions are generated for the observed outputs (block 410). In accordance with the principles discussed herein, each of the conditions comprises an attribute identifier and one of a corresponding attribute value or range of values. By way of example, the condition identification module 214 generates the conditions 216 for each observed output of the black-box machine-learning model 116 based on the instance output probabilities 212. Each of the conditions 216 comprises a combination of an attribute identifier (e.g., 'country', 'age', 'income', and so on) and a value or range of values for the identified attribute, such as 'country=India' (value) and '100≤income<200' (range of values). The procedure 400 continues at 'A' from FIG. 4A to FIG. 4B.

The conditions generated for an observed output are combined to generate rules describing behavior of the black-box machine-learning model (block 412). In accordance with the principles discussed herein, the conditions are combined using a genetic algorithm. By way of example, the condition combination module 218 combines at least two of the conditions 216 generated for an observed output to generate a rule describing behavior of the black-box machine-learning model 116. To combine the conditions 216 into rules, the condition combination module 218 employs a genetic algorithm as described in more detail above.

Redundant rules are removed (block 414). By way of example, the condition combination module 218 removes, from the rules produced by the genetic algorithm at block 412, any redundant rules. For instance, the condition combination module 218 iterates over the rules produced by the genetic algorithm and removes the rules that correspond to a subset of an already-considered rule. A subset of remaining rules is selected for each of the observed outputs based on at least one selection technique (block 416). By way of example, the condition combination module 218 elects a subset of the rules that remain after the removal discussed at block 414. The condition combination module 218 selects this subset of rules based on one or more selection techniques.

The selected rules are sorted based on a measure of fitness (block 418). In accordance with the principles discussed herein, the measure of fitness is indicative of a precision and coverage of a rule in relation to the observed outputs. By way of example, the condition combination module 218 computes the measure of fitness (e.g., F1-score) for the rules selected at block 416 and then sorts the rules according to the measure of fitness.

The selected rules are output (block 420). In accordance with the principles discussed herein, the output rules are sorted according to the sorting of block 418. Further, the selected rules output are formatted as if-then statements. By way of example, the client device 104 outputs the determined black-box rules 220. For instance, the client device 104 displays one or more of the determined black-box rules 220 via the rule-presentation interface 302. In at least some implementations, the client device 104 outputs the rules according to the order in which sorted at block 418. Additionally, the determined black-box rules 220 are output as if-then statements, an example of which is 'IF 10≤age<25 AND state=California THEN Predict content_1'. Though the determined black-box rules 220 are displayed in the aforementioned example, these rules may be output in other ways, such as audibly.

Figure 5:
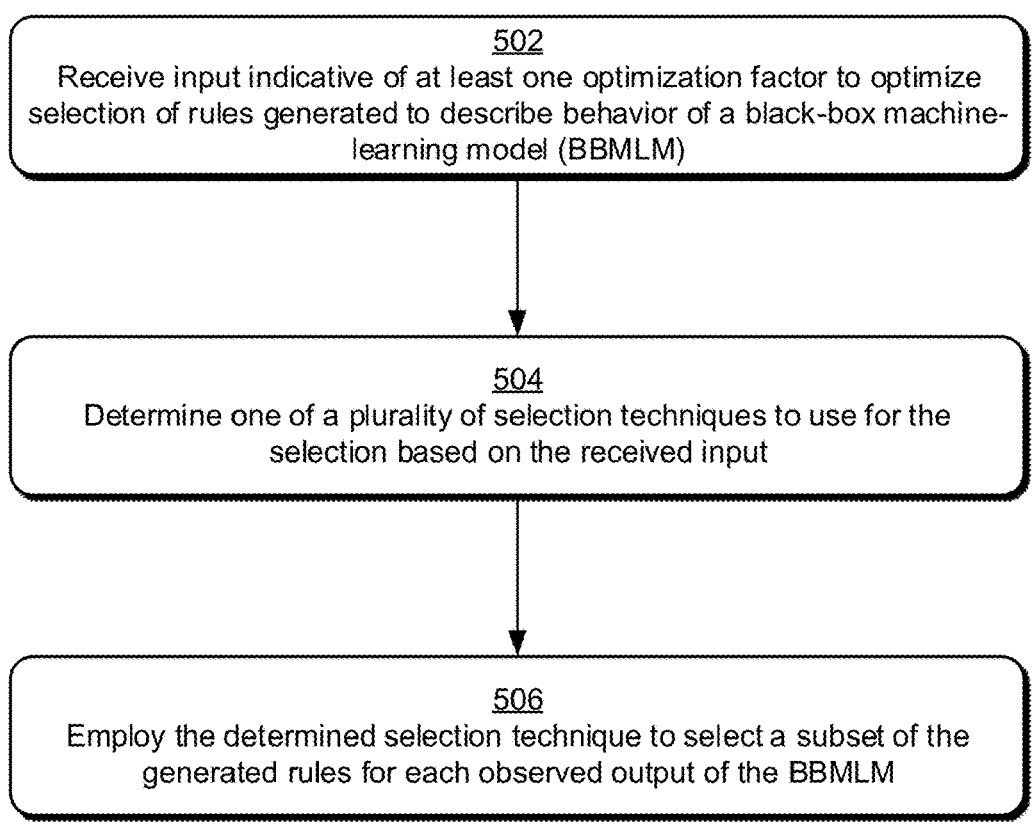
FIG. 5 depicts a procedure in an example implementation in which a selection technique is determined for selecting a subset of the rules based on input indicating at least one optimization factor to optimize the selection.

FIG. 5 depicts an example procedure 500 in which a selection technique is determined for selecting a subset of the rules based on input indicating at least one optimization factor to optimize the selection. Input is received that is indicative of at least one optimization factor to optimize selection of rules that are generated to describe behavior of a black-box machine-learning model (block 502). By way of example, the client device 104 receives input indicative of at least one optimization factor to optimize the rule selection discussed in relation to block 416 of FIG. 4. Examples of optimization factors include highest coverage measure, highest fitness measure, highest precision measure, further genetic algorithm optimization (balanced optimization), and so forth.

A determination is made to use one of multiple different selection techniques for selection of the rules based on the received input (block 504). By way of example, the condition combination module 218 determines to use one of multiple different selection techniques for selecting the rules based on the input received at block 502. For instance, the condition combination module 218 determines to perform the selection described at block 416 using one of the above-discussed coverage-optimizing selection technique, fitness-measure optimizing selection technique, or the second-level genetic algorithm selection technique.

The determined selection technique is employed to select a subset of the rules generated for each observed output of the black-box machine-learning model (block 506). By way of example, the selection technique determined at block 504 is used to select a subset of the rules generated for each observed output of the black-box machine-learning model 116, as discussed in relation to block 416 of FIG. 4.

Having described example procedures in accordance with one or more implementations, consider now an example system and device that can be utilized to implement the various techniques described herein.

Example System and Device

Figure 6:
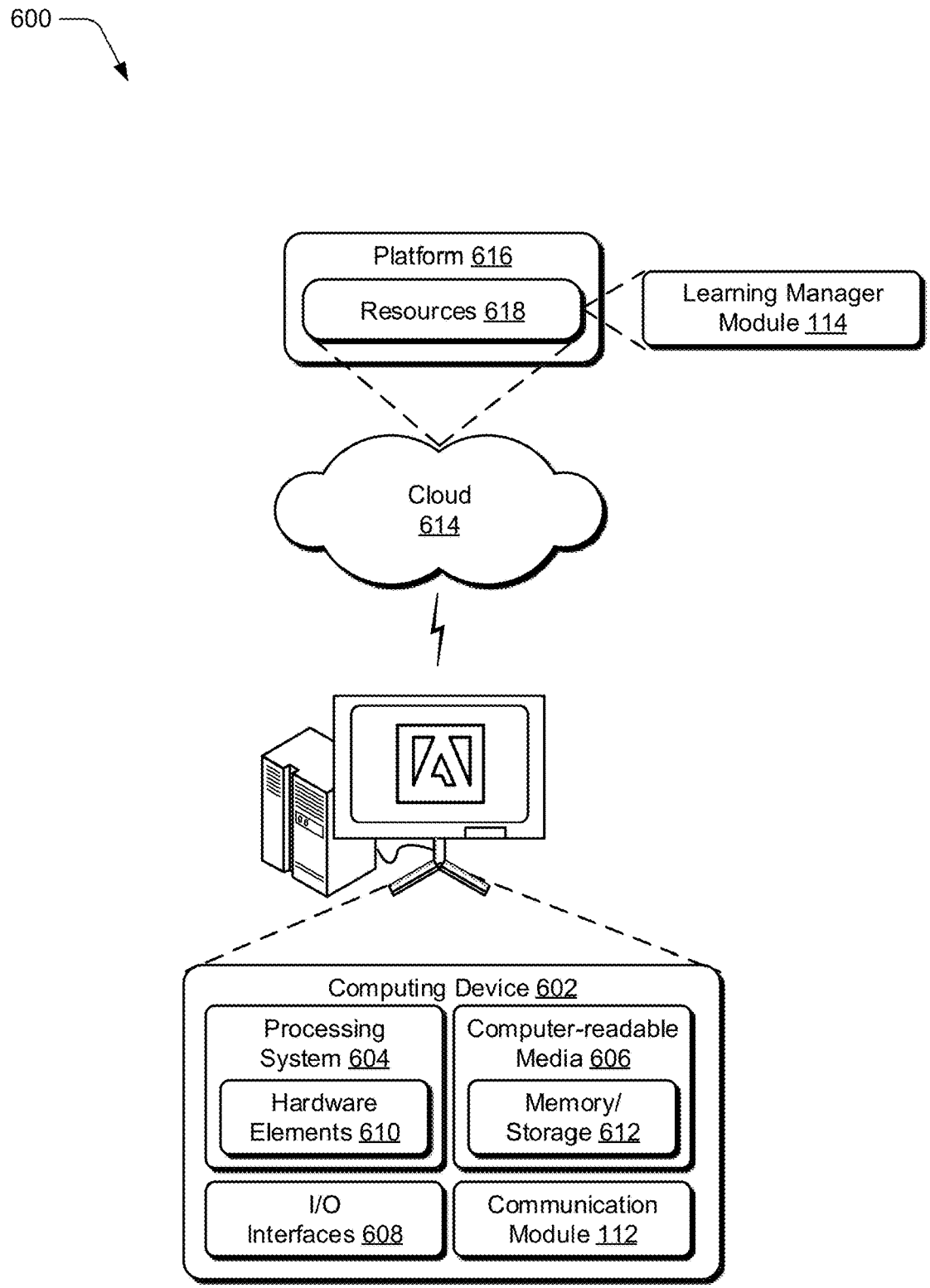
FIG. 6 illustrates an example system including various components of an example device that can be implemented as any type of computing device as described and/or utilized with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. This is illustrated through inclusion of the learning manager module 114 and the communication module 112. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    training, by a computing device, a proxy black-box model to imitate behavior of a black-box machine-learning model based on data indicating observed outputs of the black-box machine-learning model that the black-box machine-learning model associates with inputs to the black-box machine-learning model, the proxy black-box model generated solely from the inputs and the observed outputs, and further generated without knowledge of logic and model-type used in operation by the black-box machine-learning model to associate the observed outputs with the inputs;
    forming, by the computing device, input instances of the inputs as categorical attributes and corresponding values;
    exposing, by the computing device, the input instances to the proxy black-box model;
    receiving, by the computing device and from the proxy black-box model, probabilities that the black-box machine-learning model associates the input instances with the observed outputs; and
    generating, by the computing device, rules in human-interpretable form that describe how the black-box machine-learning model produced the observed outputs from the inputs based on the probabilities and by using a genetic algorithm, the rules comprising a combination of conditions, each condition having a categorical attribute and a corresponding value that is associated with an observed output based on the probabilities.

2. The method of claim 1, wherein the rules are configured as if-then statements in which the combination of conditions forms an if-portion of a statement and the observed output associated with the corresponding value forms a then-portion of the statement.

3. The method of claim 1, wherein the observed outputs are classes that the black-box machine-learning model associates with instances of the inputs.

4. The method of claim 1, wherein using the genetic algorithm includes:
    computing a fitness measure for iterations of rules produced by the genetic algorithm; and
    discontinuing the iterations by the genetic algorithm based on the fitness measure.

5. The method of claim 4, wherein the fitness measure is a function of at least a measure of precision and a measure of coverage of the rules produced by the genetic algorithm for an iteration.

6. The method of claim 5, wherein the fitness measure is further a function of rule length of the rules produced by the genetic algorithm for the iteration.

7. The method of claim 5, wherein the fitness measure is further a function of rule overlap of the rules produced by the genetic algorithm for the iteration.

8. The method of claim 1, further comprising selecting a subset of the rules to describe the operation of the black-box machine-learning model.

9. The method of claim 8, wherein the subset of rules is selected based on a selection technique configured to optimize coverage of the rules.

10. The method of claim 8, wherein the subset of rules is selected based on a selection technique configured to optimize a fitness measure that is a function of both precision and coverage of the rules.

11. The method of claim 8, wherein the subset of rules is selected based on a selection technique that leverages a second genetic algorithm that iteratively produces subsets of selected rules and discontinues iterative production based on a fitness measure.

12. The method of claim 8, further comprising:
    sorting rules of the subset of rules based on a measure of precision and a measure of coverage of the rules;
    generating an ordered list of the rules of the subset of rules according to the sorting; and
    outputting the ordered list of rules as describing the operation of the black-box machine-learning model.

13. The method of claim 12, wherein the ordered list of rules is inserted into a document for presentation via a client device.

14. A system comprising:
a proxy model generation module implemented at least partially in hardware of at least one computing device to train a proxy black-box model to imitate behavior of a black-box machine-learning model based solely on inputs to the black-box machine-learning model and observed outputs of the black-box machine-learning model and without knowledge of logic and model-type used in operation by the black-box machine-learning model to associate the inputs with the observed outputs;
a model manipulation module implemented at least partially in hardware of the at least one computing device to:
form input instances of the inputs as categorical attributes and corresponding values; and
expose the input instances to the proxy black-box model;
a condition identification module implemented at least partially in the hardware of the at least one computing device to identify conditions for the observed outputs, the conditions identified based on probabilities that the black-box machine-learning model associates the input instances with the observed outputs, the probabilities received as output of the proxy black-box model; and
a condition combination module implemented at least partially in the hardware of the at least one computing device to combine the conditions to form rules in human-interpretable form that describe how the black-box machine-learning model produced the observed outputs from the inputs.

15. The system of claim 14, wherein the condition combination module forms the rules by combining the conditions using a genetic algorithm.

16. The system of claim 14, wherein a condition comprises a categorical attribute and a corresponding value that is associated with an observed output based on the probabilities.

17. One or more computer-readable storage media storing instructions that are executable by one or more processors to perform operations comprising:
training a proxy black-box model to imitate behavior of a black-box machine-learning model based solely on inputs to the black-box machine-learning model and observed outputs of the black-box machine-learning model and without knowledge of logic and model-type used in operation by the black-box machine-learning model to associate the inputs with the observed outputs;
forming input instances of the inputs as categorical attributes and corresponding values;
exposing the input instances to the proxy black-box model;
receiving, from the proxy black-box model, probabilities that the black-box machine-learning model associates the input instances with the observed outputs; and
generating rules in human-interpretable form that describe how the black-box machine-learning model produced the observed outputs from the inputs based on the probabilities and by using a genetic algorithm, the rules comprising a combination of conditions, each condition having a categorical attribute and a corresponding value that is associated with an observed output based on the probabilities.

18. The one or more computer-readable storage media of claim 17, wherein the operations further comprise receiving input indicative of at least one optimization factor for selecting the rules from candidate rules describing the operation of the black-box machine-learning model.

19. The method as described in one or more computer-readable storage media of claim 17, wherein the operations further comprise presenting the rules via a rule presentation interface.

20. The system of claim 15, wherein combining the conditions using the genetic algorithm includes:
computing a fitness measure for iterations of rules produced by the genetic algorithm; and
discontinuing the iterations by the genetic algorithm based on the fitness measure.

* * * * *

UNITED STATES PATENT AND TRADEMARK OFFICE
CERTIFICATE OF CORRECTION

PATENT NO. : 11,354,590 B2
APPLICATION NO. : 15/812991
DATED : June 7, 2022
INVENTOR(S) : Piyush Gupta et al.

Page 1 of 1

It is certified that error appears in the above-identified patent and that said Letters Patent is hereby corrected as shown below:

In the Claims

Column 28, Line 30, after "The", delete "method as described in".

Signed and Sealed this
Second Day of August, 2022

Katherine Kelly Vidal
*Director of the United States Patent and Trademark Office*